June 24, 1930.                L. SCUSA                1,765,624
                      SUPPORT FOR INDICATOR GAUGES
                         Filed Feb. 27, 1928
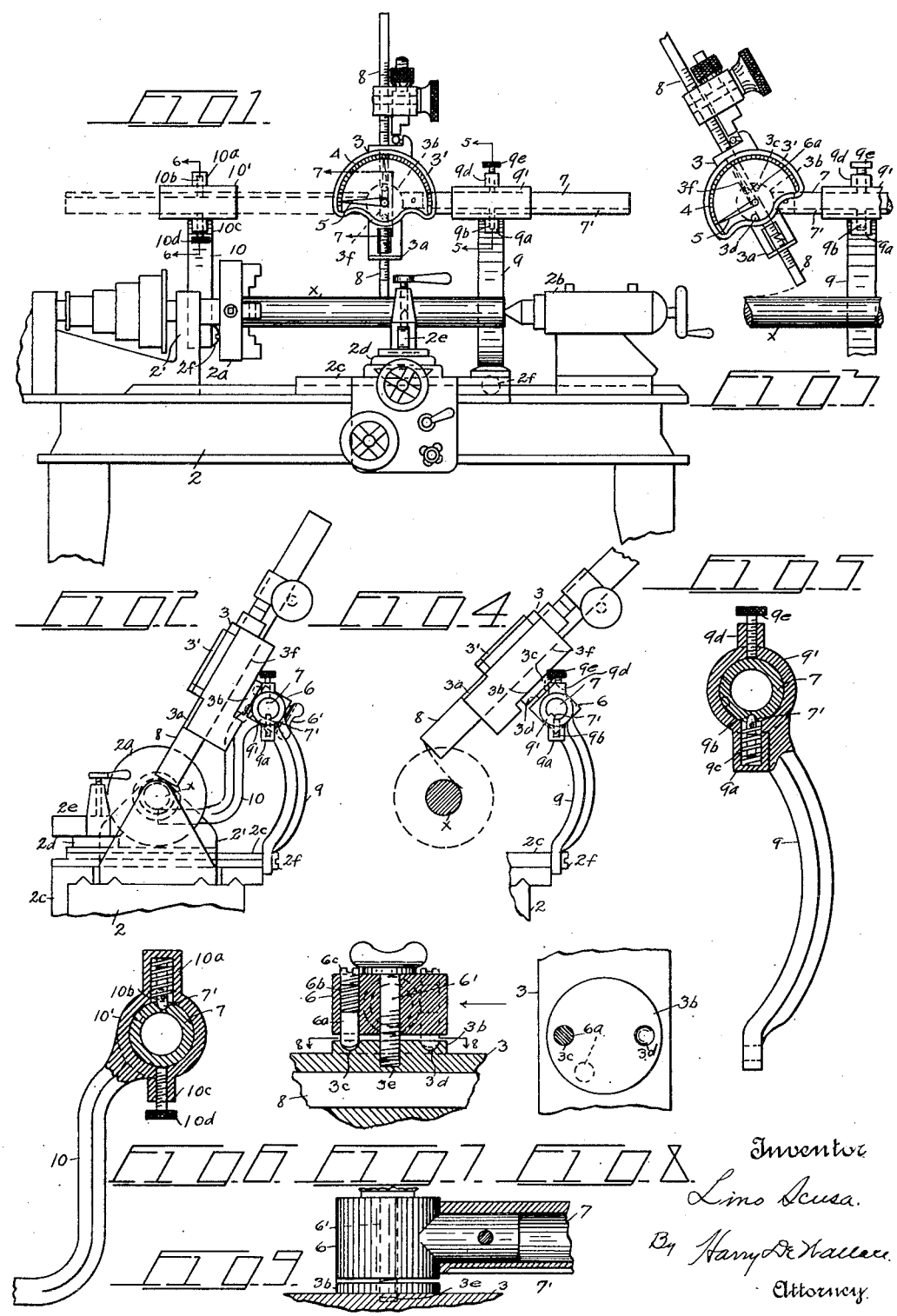

Patented June 24, 1930

1,765,624

UNITED STATES PATENT OFFICE

LINO SCUSA, OF PHOENIX, NEW YORK

SUPPORT FOR INDICATOR GAUGES

Application filed February 27, 1928. Serial No. 257,386.

This invention relates to means for adjustably supporting indicator gauges and the like, and has for its object to provide a novel combination of coordinated supporting elements whereby the gauge may be held with a certain rigidity in a number of operative and inoperative positions and yet yield when subjected to undue strain or pressure, for enabling the gauge to be rotated or swung by the operator on one or more axes in different directions during the gauging, or when not required for gauging; and certain of the said supporting elements being arranged to safeguard the gauge in case the scale bar is accidentally struck or otherwise roughly handled. A further object is to provide a series of similar brackets by which the gauge mechanism may be mounted upon a lathe, one of said brackets being secured to the carriage of the lathe whereby said mechanism may be carried along with the carriage and the scale bar maintained in the proper position relatively to the cutting tool; the said bracket being arranged to hold the gauge mechanism in the operative position by tension-controlled means that needs no attention on the part of the operator, and said bracket being equipped with means for holding the gauge in any adjusted positions against the ordinary lathe vibrations. A further object is to provide means whereby the gauge mechanism may be disposed or rotated in planes at different angles to the axes of the work and the said bracket. A further object is to provide brackets or like elements which may be fixed rigidly to the head or other stationary part of the lathe for adjustably supporting and enabling the gauge mechanism to be moved in planes parallel to the axis of the lathe in order to effect gauging in close proximity to the lathe chuck. And a further object is to generally improve and simplify gauge supports of the character, as well as to render the gauge universal in its movements relatively to the work.

I attain these objects by the means set forth in the detailed description as follows, and as illustrated by the accompanying drawing, in which—

Figure 1 is a broken front side elevation of a lathe to which my improvement is applied, showing the gauge in the operative position and movable with the carriage. Fig. 2 is a rear end elevation of the same, showing the gauge supported in the operative position by a bracket secured to the carriage. Fig. 3 is a broken elevational view of the carriage bracket, showing the gauge tilted at an angle to the operative position of Fig. 1. Fig. 4 is a broken end elevation, showing the gauge tilted, in a plane at right angles to the axis of the work. Fig. 5 is an enlarged view of the carriage bracket partially in elevation and partially in vertical section, the latter taken on line 5—5 of Fig. 1, showing the groove of the guide rod facing downwardly. Fig. 6 is a similar view of the bracket secured to the head of the lathe, partially in elevation, and partially in vertical section taken on line 6—6 of Fig. 1, showing the guide rod reversed and its groove facing upwardly. Fig. 7 is a sectional view, taken substantially on line 7—7 of Fig. 1, showing the means for pivoting the gauge body to the guide rod. Fig. 8 is a horizontal section, taken on line 8—8 of Fig. 7. And Fig. 9 is a broken elevational view, taken in the direction of the arrow in Fig. 7, showing the guide rod connected to the gauge body.

In the drawing, Fig. 1 shows conventionally a lathe, comprising a frame 2, head 2', chuck $2^a$, tail-piece $2^b$, and carriage $2^c$, upon which is mounted the usual tool rest $2^d$, and tool $2^e$. 3 represents generally the indicator gauge, which consists of a semi-circular hollow body 3' having a leg $3^a$, the body being provided with a dial 4, and a needle 5 that sweeps the dial, and preferably indicates fine fractional parts of an inch. The rear face of the body 3' is formed with a circular boss $3^b$, in which are formed diametrically opposed sockets $3^c$—$3^d$, the said boss having a concentric threaded opening $3^e$ to receive a screw 6', that pivotally supports the cylindrical member 6, the said member being normally spaced from the boss and provided with a tension-controlled pin $6^a$, which is adapted to engage the said sockets when member 6 is rotated on the screw 6′. To member 6 is detachably but rigidly secured a guide rod 7, (see Fig. 9), which may be tubular, as shown in the drawing, the said rod having an external longitudinal groove or socket 7′, as best seen in Figs. 2, 4, 5 and 6. The rod 7 may be swung on the (screw 6′) body 3′, for reversing its direction, by the loosening of the screw 6′, and provided that sufficient force is exerted to cause the pin $6^a$ to be dislodged from the engaged socket ($3^c$), as may be understood by Figs. 1, 3, 7 and 8. The pin $6^a$ is normally under tension of a spring $6^b$, which is held in place by a screw $6^c$. The body 3′ is slotted vertically, as at $3^f$, to slidably receive the gauge bar 8, said bar being graduated for indicating certain measured movements of the bar, and its lower end being normally held by gravity in engagement with a piece of work, as $x$, for gauging and indicating the progress of the turning, by tool 2 (see Fig. 1).

In Figs. 1 and 2, the gauge 3 is shown in the operative position, wherein the scale bar 8 rests upon the work $x$. In Fig. 3 the gauge is shown tilted on the guide rod 7, by the dislodgment of the pin $6^a$ from the socket $3^c$ to the extent shown by the dotted circle in Fig. 7. The provision of the pin $6^a$ and the sockets $3^c$—$3^d$ enables the gauge mechanism to be swung in either direction in planes parallel to the axis of the work $x$, in case the gauge bar 8 is accidentally struck a blow. The operator may effect the same swinging of the gauge to enable him to remove or replace the work.

9 represents an upright bracket which is preferably mounted upon the rear edge of the carriage $2^c$, as by a screw $2^f$, and travels with the carriage. The top end of the bracket 9 is formed with a tubular cross-head 9′, whose axis parallels that of the work $x$, the bore of said head corresponding to the diameter of the guide rod 7, in which said rod may be reciprocated and rotated for positioning the gauge 3 relatively to the tool $2^e$, as shown in Figs. 1 and 2. The head 9′ is formed with a depending socket or lug $9^a$, in which is disposed a pin $9^b$ that is arranged to engage the groove 7′ of the guide rod, for guiding the latter as well as preventing its accidental rotation in the head (see Figs. 2, 4 and 5). The pin $9^b$ is preferably yieldably held in the groove 7′ by a spring $9^c$, as shown in Fig. 5.

In Fig. 4 the gauge 3 is shown tilted upwardly away from the work $x$ upon the axis of the cross-head 9′, and the pin $9^b$ is disengaged from the groove 7′ of the rod. The spring $9^c$ tends to hold the gauge in the latter or any other tilted position, and the gauge may be righted, as shown in Figs. 1 and 2, by the operator simply swinging the body 3′ in the reverse direction until the pin $9^b$ again snaps into the groove 7′ which brings the scale bar 8 into the operative positions, of Figs. 1 and 2. The head 9′ is also formed with an upwardly facing threaded lug $9^d$ to receive a set-screw $9^e$, by which the rod 7 may be made rigid in the head.

10 represents a bracket which is shown rigidly mounted on the head 2′ of the lathe, as by a screw $2^f$, and said bracket is therefore stationary at all times. Bracket 10 has a similar cross-head 10′, a socket $10^a$, which houses a tension-controlled pin $10^b$, a threaded lug $10^c$, and a set-screw $10^d$, but the sockets $10^a$ and $10^c$ are inverted as compared with bracket 9, as shown at the left in Fig. 1, and as shown in Fig. 8, for enabling the rod 7, which must also be reversed, in order to properly position the gauge bar 8 close to the right face of the chuck adjacent which tool $2^e$ may be cutting.

Having thus described my invention, what I claim, is—

1. An indicator gauge support for lathes and the like, including a bracket having a tubular head, means to secure the bracket to a lathe, a guide rod rotatably and slidably received in said bracket head and having a head on one end thereof, means to rotatably connect a gauge to the rod head so as to permit the gauge to move in a plane parallel to the axis of the rod, means to yieldably secure the rod head against rotation relative to the gauge, and means to adjustably secure the rod to the bracket head.

2. An indicator gauge support for lathes and the like including a supporting member, means to secure the member to a lathe, a guide rod, means to rotatably connect said rod to the supporting member, and means to rotatably secure a gauge to the rod for movement in a plane parallel to the axis of the rod.

3. An indicator gauge support for lathes and the like including a supporting member, means to secure the member to a lathe, a guide rod, means to rotatably connect said rod to the supporting member, yielding means to hold the rod against accidental rotation while permitting same to rotate under abnormal pressure, means to rotatably connect a gauge to the rod, and yielding means to hold the gauge against accidental rotation while permitting same to rotate under abnormal pressure.

4. An indicator gauge for a lathe or the like including a pair of spaced supports each having a tubular head, a gauge having a movable work engaging element, a rod receivable in either of said heads, and means to rotatably connect the rod to the gauge so as to enable same to be rotated throughout substantially 180° thereby to support the gauge from either of the supports and with the gauge maintaining its same relation to the work on either of the said positions of the rod.

5. An indicator gauge for a lathe or the like including a pair of spaced supports, gauge mounting means, means to secure said mounting means to either of the supports, and means to rotatably secure said mounting means to a gauge so as to enable the mounting means to be rotated about the gauge and secured to either of the supports and with the gauge maintaining its same relation to the work in either of said positions of the mounting means.

6. An indicator gauge for a lathe or the like including a pair of spaced supports each having a tubular head, a rod receivable in either of said heads, and means to rotatably connect the rod to a gauge so as to enable same to be rotated throughout substantially 180° thereby to support the gauge from either of the supports and with the gauge maintaining its same relation to the work in either of the said positions of the rod, said rod having a longitudinal groove, and tensioned rod holding means carried by the supports and disposed to engage in said groove in its respective positions.

7. An indicator gauge support for lathes and the like including a supporting member, means to secure the member to a lathe, a guide rod, means to rotatably connect a gauge to the rod, means to rotatably connect said rod to the supporting member, and yielding means to hold the rod against accidental rotation, said yielding means being of such predetermined strength as to permit the rod to rotate under abnormal pressure.

In testimony whereof I affix my signature.

LINO SCUSA.